United States Patent
Burkhardt et al.

(10) Patent No.: US 7,805,940 B2
(45) Date of Patent: Oct. 5, 2010

(54) METHOD AND DEVICE FOR THE CONTROL AND DIAGNOSIS OF AN EXHAUST GAS TURBOCHARGER

(75) Inventors: Thomas Burkhardt, Neutraubling (DE); Markus Teiner, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 272 days.

(21) Appl. No.: 11/666,126

(22) PCT Filed: Sep. 19, 2005

(86) PCT No.: PCT/EP2005/054646

§ 371 (c)(1), (2), (4) Date: Apr. 24, 2007

(87) PCT Pub. No.: WO2006/045674

PCT Pub. Date: May 4, 2006

(65) Prior Publication Data

US 2008/0000227 A1    Jan. 3, 2008

(30) Foreign Application Priority Data

Oct. 25, 2004   (DE) .................. 10 2004 051 837

(51) Int. Cl.
*F02G 3/00* (2006.01)
(52) U.S. Cl. ........................ 60/611; 60/615; 123/564
(58) Field of Classification Search .............. 123/564; 60/600, 602, 611, 615
See application file for complete search history.

(56) References Cited

U.S. PATENT DOCUMENTS

| | | | | |
|---|---|---|---|---|
| 4,428,199 A | | 1/1984 | Moore et al. | |
| 4,622,816 A | * | 11/1986 | Boudigues | 60/606 |
| 6,067,800 A | * | 5/2000 | Kolmanovsky et al. | 60/602 |
| 6,698,203 B2 | | 3/2004 | Wang | |
| 6,732,523 B2 | * | 5/2004 | Birkner et al. | 60/605.1 |
| 6,820,600 B1 | * | 11/2004 | Sisken et al. | 123/568.21 |
| 6,863,058 B2 | * | 3/2005 | Kurtz et al. | 123/672 |
| 6,996,986 B2 | * | 2/2006 | Arnold | 60/602 |
| 7,047,741 B2 | * | 5/2006 | Gray, Jr. | 60/603 |
| 7,287,377 B2 | * | 10/2007 | Wild et al. | 60/602 |

(Continued)

FOREIGN PATENT DOCUMENTS

| | | |
|---|---|---|
| DE | 102 13 529 C1 | 7/2003 |
| EP | 1 024 260 A2 | 8/2000 |

*Primary Examiner*—Thomas Denion
*Assistant Examiner*—Douglas J. Duff
(74) *Attorney, Agent, or Firm*—K&L Gates LLP

(57) ABSTRACT

There is described an exhaust gas turbocharger which comprises a compressor and a turbine having an adjusting drive for adjusting a turbine geometry. A performance characteristic is determined depending on a turbine output, a mass flow through the turbine and a gas temperature upstream of the turbine. A mass flow characteristic is determined depending on the mass flow through the turbine and the gas temperature upstream of the turbine and a gas pressure downstream of the turbine. Depending on the performance characteristic and the mass flow characteristic, an adjuster position of the adjusting drive for adjusting the turbine geometry is determined using a characteristic diagram. For control, an adjusting signal for controlling the adjusting drive is determined depending on the adjuster position for adjusting the turbine geometry. For diagnosis of the exhaust gas turbocharger, the exhaust gas turbocharger is diagnosed depending on the adjuster position.

20 Claims, 3 Drawing Sheets

U.S. PATENT DOCUMENTS 7,380,401 B2 * 6/2008 Henn et al. .................. 60/612
7,398,649 B2 * 7/2008 Bauer et al. ................ 60/605.2
7,415,389 B2 * 8/2008 Stewart et al. ............. 702/185
7,493,762 B2 * 2/2009 Barbe et al. ................ 60/605.2
2002/0053207 A1 5/2002 Finger et al.
2003/0115875 A1 6/2003 Sumser et al.

* cited by examiner

METHOD AND DEVICE FOR THE CONTROL AND DIAGNOSIS OF AN EXHAUST GAS TURBOCHARGER

CROSS REFERENCE TO RELATED APPLICATIONS

This application is the US National Stage of International Application No. PCT/EP2005/054646, filed Sep. 19, 2005 and claims the benefit thereof. The International Application claims the benefits of German application No. 10 2004 051 837.8 DE filed Oct. 25, 2004, both of the applications are incorporated by reference herein in their entirety.

FIELD OF INVENTION

The invention relates to a method and a device for control and for diagnosis of an exhaust gas turbocharger. Exhaust gas turbochargers are used especially in internal combustion engines and comprise a compressor, which is coupled mechanically to a turbine. The turbine is arranged in an exhaust gas tract of the internal combustion engine and uses the thermal energy of the exhaust gas to drive the compressor which is arranged in an induction tract of the internal combustion engine.

BACKGROUND OF INVENTION

Employing the exhaust gas turbocharger in a suitable manner allows the power output of the internal combustion engine to be increased for a specified engine capacity. Furthermore, because of the lower weight per unit of power, the efficiency of the internal combustion engine can be increased by means of the exhaust gas turbocharger.

Exhaust gas turbochargers which have variable geometry exhibit a particularly high level of efficiency, that is those which have an adjusting drive to adjust the turbine geometry by means of which the efficiency of the turbine can be varied. Exhaust gas turbochargers with variable turbine geometry are widely used in diesel internal combustion engines and can be used in these engines without any problem because of the relatively low exhaust gas temperatures. Exhaust gas turbochargers with variable turbine geometry are also used in gasoline internal combustion engines.

SUMMARY OF INVENTION

An object of the invention is to create a method and a device for controlling an exhaust gas turbocharger which allow precise control of the exhaust gas turbocharger in a simple manner in each case. A further object of the invention is to create a method and a device for diagnosis of an exhaust gas turbocharger which allow the precise diagnosis of the exhaust gas turbocharger in a simple manner in each case.

The object is achieved by the features of the independent claims. Advantageous embodiments of the invention are identified in the sub claims.

The outstanding features of the invention as claimed in its first aspect are a method and a corresponding device for controlling an exhaust gas turbocharger with a compressor and a turbine. The turbine is assigned an adjusting drive for adjusting a turbine geometry. A performance characteristic is determined which depends on a turbine output, a mass flow through the turbine and a gas temperature upstream from the turbine. A mass flow characteristic is determined depending on the flow through the turbine and the induction gas temperature upstream of the turbine and a downstream gas pressure downstream of the turbine. Depending on the performance characteristic and the mass flow characteristic, an adjuster position of the adjusting drive for adjusting the turbine geometry is determined using an engine map. Depending on the adjuster position for adjusting the turbine geometry an adjustment signal for controlling the adjusting drive is determined.

The invention also stands out as claimed in a further aspect through a method and a corresponding device for diagnosis of a exhaust gas turbocharger, in which a diagnosis of the exhaust gas turbocharger is undertaken depending on the adjuster position for adjusting the turbine geometry.

The performance characteristic can be determined especially simply since the mass flow through the turbine is generally to be equated with the mass flow which flows after combustion of the air/fuel mixture out of the cylinder into an exhaust gas tract of an internal combustion engine. Thus the mass flow through the turbine correlates with a measured gas mass in the cylinders of the internal combustion engine and the measured fuel mass, of which at least one desired gas mass flow in the cylinders of the internal combustion engine and one desired measured fuel mass for controlling the internal combustion engine are known in any event.

The gas temperature upstream of the turbine can either be detected directly by means of a suitable temperature sensor or can also be determined simply by means of a physical exhaust gas temperature model, depending inter alia on the measured fuel mass and/or the gas mass flow into the cylinders. The turbine output can be simply predetermined as a function of the operating point of the internal combustion engine. The gas pressure downstream of the turbine can be detected directly by means of a suitable pressure sensor or also simply estimated without an additional pressure sensor from an ambient pressure and a dynamic pressure in the exhaust gas tract of the internal combustion engine, with the dynamic pressure depending on the mass flow through the turbine.

The assignment between the relevant adjuster positions of the adjusting drive for adjusting the turbine geometry, of the performance characteristic and of the mass flow characteristic can be derived in a simple manner from engine maps determined at regular intervals by the manufacturer of the exhaust gas turbocharger through corresponding measurements and are thus readily available.

In accordance with an advantageous embodiment of the invention the performance characteristic is determined depending on the turbine output divided by the mass flow through the turbine and divided by the gas temperature upstream of the turbine.

In accordance with a further advantageous embodiment of the invention, the mass flow characteristic is determined depending on the turbine output multiplied by the square root of the gas temperature upstream of the turbine and divided by the downstream gas pressure. In this manner the engine map, by means of which an adjuster position of the adjusting drive for adjusting the turbine geometry is determined, can be determined especially simply and precisely.

In accordance with a further advantageous embodiment of the invention the engine map has as its input variables the performance characteristic and the mass flow characteristic. This is based on the surprising knowledge that a sufficiently precise determination in the relevant adjuster position is also possible independent of a turbine speed. The result of this is that a significantly smaller storage space is required for the engine map from which the adjuster position of the adjusting drive is determined than if the turbine speed were to be used as an additional input variable. Furthermore the computing effort for interpolation between support points of the engine map is also considerably reduced because of the smaller dimensions of the engine map.

In accordance with a further advantageous embodiment of the invention the performance characteristic is transformed and this is done such that the engine map points of the same transformed performance characteristics are essentially assigned the same values of the adjuster position. The adjuster position for adjusting the turbine geometry is determined depending on the transformed performance characteristics. This has the advantage that controllable operating points of the turbine are thus distributed more favorably over the engine map for determining the adjuster position with the consequence that, with the same storage space requirement, a more precise control and also diagnosis of the exhaust gas turbocharger is possible.

In accordance with a further advantageous embodiment of the invention, depending on the adjuster position and the mass flow characteristic, by means of a further engine map and depending on the upstream gas pressure, a downstream gas pressure is determined which obtains downstream of the turbine. In this way the downstream gas pressure can also be determined without additionally required process variables, which can then be advantageously employed for correcting a volumetric efficiency.

In accordance with a further advantageous embodiment of the invention, an adjusting signal for adjusting a position of an exhaust valve is determined depending on the adjuster position for the variable turbine geometry. In this manner, with an existing bypass valve in a bypass channel to the turbine of the exhaust gas turbocharger, the operating range of the exhaust gas turbocharger can be further expanded in a simple manner.

BRIEF DESCRIPTION OF THE DRAWINGS

Exemplary embodiments of the invention are explained below with reference to the schematic diagrams. The figures show.

Elements which are constructed or which function in the same way are identified by the same reference symbol in all Figures.

DETAILED DESCRIPTION OF INVENTION

Figure 1:
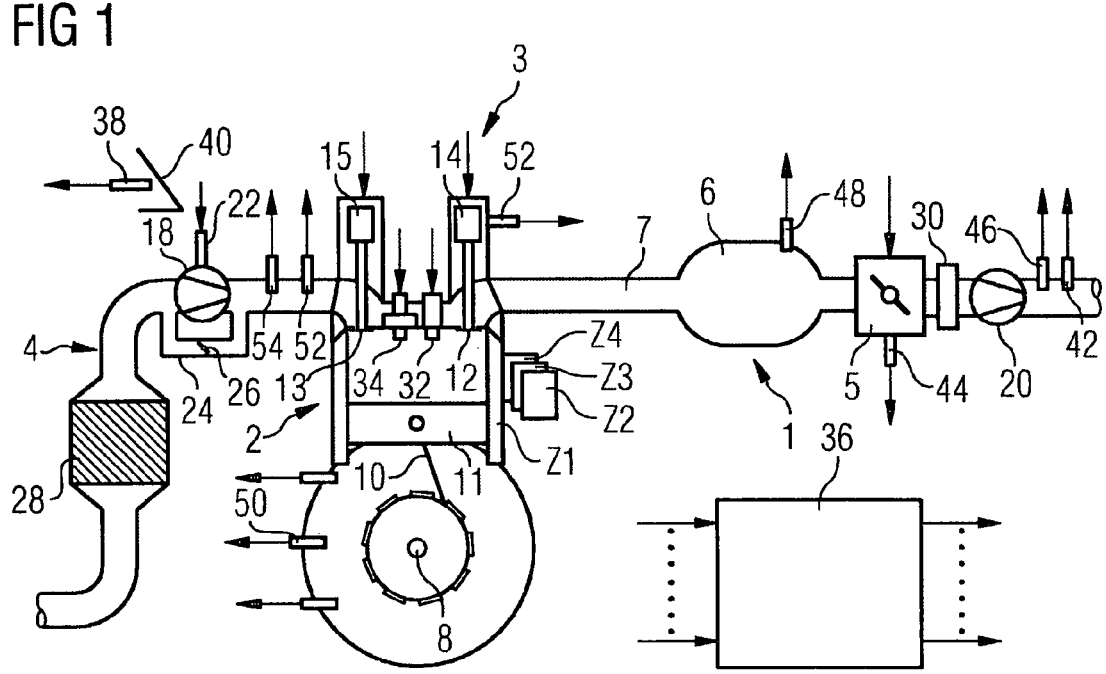
FIG. 1 an internal combustion engine with an exhaust gas turbocharger and a control device, FIG. 2 a flowchart of a program for controlling and/or diagnosis of the exhaust gas turbocharger, FIG. 3 a first engine map, and FIG. 4 a second engine map.

An internal combustion engine (FIG. 1) comprises an induction tract 1, an engine block 2, a cylinder head 3 and an exhaust gas tract 4. The induction tract 1 preferably comprises a throttle valve 5, also a collector 6 and an induction pipe 7, which is routed through to the cylinder Z1 via an inlet channel in the engine block 2. The engine block further comprises a crankshaft 2, which is coupled via a connecting rod 10 to the piston 11 of the cylinder Z1.

The cylinder head 3 comprises a valve-actuating mechanism with a gas inlet valve 12, a gas exhaust valve 13 and valve-actuating mechanisms 14, 15.

Preferably a camshaft is provided which operates via cams on the gas inlet valve 12 and the gas exhaust valve 13. The cylinder head 3 further comprises an injection valve 32 and a spark plug 34. Alternatively the injection valve 32 can also be arranged in the inlet manifold 7. Furthermore the spark plug 34 can also be omitted in the case of a combustion process with self-ignition of the mixture.

Furthermore an exhaust gas turbocharger is assigned to the induction tract 1 and exhaust gas tract 4. The exhaust gas turbocharger comprises a turbine 18, which is mechanically coupled with a compressor 20.

The turbine 18 is arranged in the exhaust gas tract 4 and converts the thermal energy of the exhaust gas into mechanical energy and thus drives the turbine 20 which is arranged in the induction tract 1. The exhaust gas turbocharger thus couples the induction tract 1 thermo-mechanically to the exhaust gas tract 4. The compressor 20 is preferably arranged downstream of the throttle valve 5 in the induction tract 1. It can however also be arranged upstream of the throttle valve 5. The turbine 18 has a variable turbine geometry. To this end the turbine 18 is assigned an adjusting drive 22 for adjusting the turbine geometry, by means of which blades of the turbine 18 or parts of the blades can be adjusted, resulting in a change to the relevant efficiency of the turbine 18.

In addition the exhaust gas turbocharger can comprise a bypass channel 24, which is routed in parallel to the turbine 18 in the exhaust gas tract 4. An exhaust valve 26 is arranged in the bypass channel 24.

A catalytic converter 28 and as a rule a silencer as well are preferably further arranged in the exhaust gas tract 4.

Preferably the exhaust gas turbocharger also comprises a charging air cooler 30 in the induction tract 1 upstream of the compressor 20.

Furthermore a control device 36 is provided to which sensors are assigned which detect different measurement variables and determine the value of the measurement variable in each case. The control device 36 determines as a function of at least one of the measurement variables control variables, which are then converted into one or more adjustment signals for controlling the adjusting elements by means of corresponding adjusting drives. The control device 36 can also as be referred to as a device for controlling the internal combustion engine.

The sensors are a pedal position sensor 38, which detects a position of the gas pedal 40, an air mass sensor 42, which detects an air mass flow upstream of the throttle valve 5, a throttle valve position sensor 44, which detects a degree of opening of the throttle valve 5, a first temperature sensor 46, which detects an induction air temperature downstream of the compressor 20, an induction manifold pressure sensor 48, which detects an induction manifold pressure in the collector 6, a crankshaft angle sensor 50 which detects a crankshaft angle which is then assigned to a speed N of the crankshaft 8. A second temperature sensor 52 detects a gas temperature T3 downstream of the turbine 18 in the exhaust gas tract 4. Furthermore a waste gas probe 54 is preferably provided which detects a residual oxygen content of the exhaust gas and of which the measuring signal is characteristic for the air/fuel ratio in the cylinder Z1.

Depending on the embodiment of the invention any subset of said sensors can be present or additional sensors can also be present.

The adjustment elements are for example the throttle valve, the gas inlet and exhaust valves 12, 13, the adjustable blades of the turbine 18 or the spark plug 34 or the injection valve 32.

As well as the cylinder Z1, further cylinders Z2 to Z4 are preferably provided, to which corresponding adjustment elements and where necessary sensors are also assigned.

A physical model of the turbine 18 of the exhaust gas turbocharger is explained in greater detail below on the basis of which a program for control and for diagnosis of the exhaust gas turbocharger is stored in the control device 36, with said program being executed during operation of the exhaust gas turbocharger.

Manufacturers of exhaust gas turbochargers regularly make engine maps available, through which the relationship between a gas pressure P3 downstream of the turbine 18 and a gas pressure P4 upstream of the turbine 18, an adjuster position PSN_VTG of the adjusting drive 22 for setting the turbine geometry, a turbine speed N_TUR and a mass flow characteristic MF_KW_P3 or a turbine efficiency ETA_TUR related to the gas pressure P3 upstream of the turbine 18 are with shown with reference to individual measuring points. These engine maps are determined by manufacturers using suitable measurements. The turbine efficiency ETA_TUR combines an isentropic efficiency of the turbine 18 and a mechanical efficiency of the exhaust gas turbocharger. The mass flow characteristic MF_KW_P3 related to the gas pressure P3 downstream of the turbine 18 is given by the following equation:

$$\mathrm{MF\_KW\_P3} = \frac{\mathrm{MF\_TUR} * \sqrt{T3}}{P3} \quad (F1)$$

A turbine output P_TUR is given by the following equation:

$$P\_TUR = MF\_TUR * DELTA\_H * ETA\_TUR \quad (F2)$$

ETA_TUR designates the enthalpy difference, which is given by:

$$\mathrm{DELTA\_H} = \mathrm{C\_P\_TUR} * T3 * \left[1 - \left(\frac{P4}{P3}\right)^{\frac{K-1}{K}}\right] \quad (F3)$$

with C_P_TUR designating the specific heat capacity at constant pressure and as a rule being a fixed value and K being the adiabate exponent, which is also preferably fixed.

The following equation is thus produced from equations F2 and F3 for the turbine output P_TUR:

$$\mathrm{P\_TUR} = \mathrm{MF\_TUR} * \mathrm{C\_P\_TUR} * T3 * \left[1 - \left(\frac{P4}{P3}\right)^{\frac{K-1}{K}}\right] * \mathrm{ETA\_TUR} \quad (F4)$$

By transforming the equation F4 the following equation is produced for a performance characteristic P_KW:

$$\mathrm{P\_KW} = \frac{\mathrm{P\_TUR}}{\mathrm{MF\_TUR} * T3} \quad (F5)$$

$$\mathrm{P\_KW} = \mathrm{C\_P\_TUR} * \left[1 - \left(\frac{P4}{P3}\right)^{\frac{K-1}{K}}\right] * \mathrm{ETA\_TUR} \quad (F6)$$

$$= f_1\left(\frac{P3}{P4}, \mathrm{N\_TUR}, \mathrm{PSN\_VTG}\right)$$

PSN_VTG designates an adjuster position of the adjusting drive 22 for adjusting the turbine geometry. In this context use is made of the fact that the turbine efficiency ETA_TUR can be regularly determined from engine maps specified by manufacturers depending on the pressure quotient PQ of the downstream pressure P3 and of the upstream pressure of the turbine P4 and the turbine speed N_TUR and the adjuster position PSN_VTG.

The right-hand side of equation F5 is known for control or diagnosis of the exhaust gas turbocharger. The power output of the turbine P_TUR is thus predetermined as setpoint value by a corresponding physical model of the compressor. Such a model is disclosed in DE 102 13 529 C1, which is incorporated by reference herein in its entirety. Furthermore the gas mass temperature T3 downstream of the turbine 18 can be detected by means of the second temperature sensor 52 or also dependent on an exhaust gas temperature model, which depends inter alia on a gas mass flow in cylinders Z1 to Z4 of the internal combustion engine and on the delivered fuel mass. The mass flow MF_TUR through the turbine 18 also correlates with the gas mass flow in the cylinders Z1 to Z4 and the delivered fuel mass. Thus the variables on the right hand side of equation F5 can be viewed as input variables of the model of the turbine 18 of the exhaust gas turbocharger.

Furthermore the throughflow equation must be satisfied which is predetermined by the relationship F1. Since however the gas pressure P3 downstream of the turbine 18 is regularly unknown, the equation F1 is expanded by the pressure quotient PQ equal to P3 to P4. This produces:

$$\mathrm{MF\_KW} = \frac{\mathrm{MF\_TUR} * \sqrt{T3}}{P4} \quad (F7)$$

$$= \mathrm{MF\_KW\_P3} * \frac{P3}{P4}$$

$$= f_2\left(\frac{P3}{P4}, \mathrm{N\_TUR}; \mathrm{PSN\_VTG}\right)$$

The relationship between the mass flow characteristic MF_KW_P3 related to the gas pressure upstream of the turbine, the pressure quotient PQ, the turbine speed N_TUR and the adjuster position PSN_VTG is frequently known for individual measured values and is made available by the relevant manufacturer of the exhaust gas turbocharger in the form of engine maps.

It is not possible by analytical means to determine an adjuster position PSN_VTG which fulfills both equation F7 and also equation F6. It is however possible by numerical means, i.e. by evaluation of the relationships calibrated by the manufacturer of the exhaust gas turbocharger, to determine the relationship between the performance characteristic P_KW and the mass flow characteristic MF_KW for different turbine speeds N_TUR and adjuster positions PSN_VTG and to store them and in a new engine map. This shows that in this connection the influence of the turbine speed N_TUR can be ignored and that a three-dimensional engine map is produced, with the input variables performance characteristic P_KW and mass flow characteristic MF_KW.

Preferably the performance characteristic P_KW is subsequently subjected to a mathematical transformation which is preferably expressed by the following equation:

$$\mathrm{P\_KW\_TRANS} = \frac{\mathrm{P\_KW} * \mathrm{TRANS\_KW1}}{\mathrm{MF\_KW} + \mathrm{TRANS\_KW3}} * \mathrm{TRANS\_KW2} \quad (F8)$$

Figure 3:
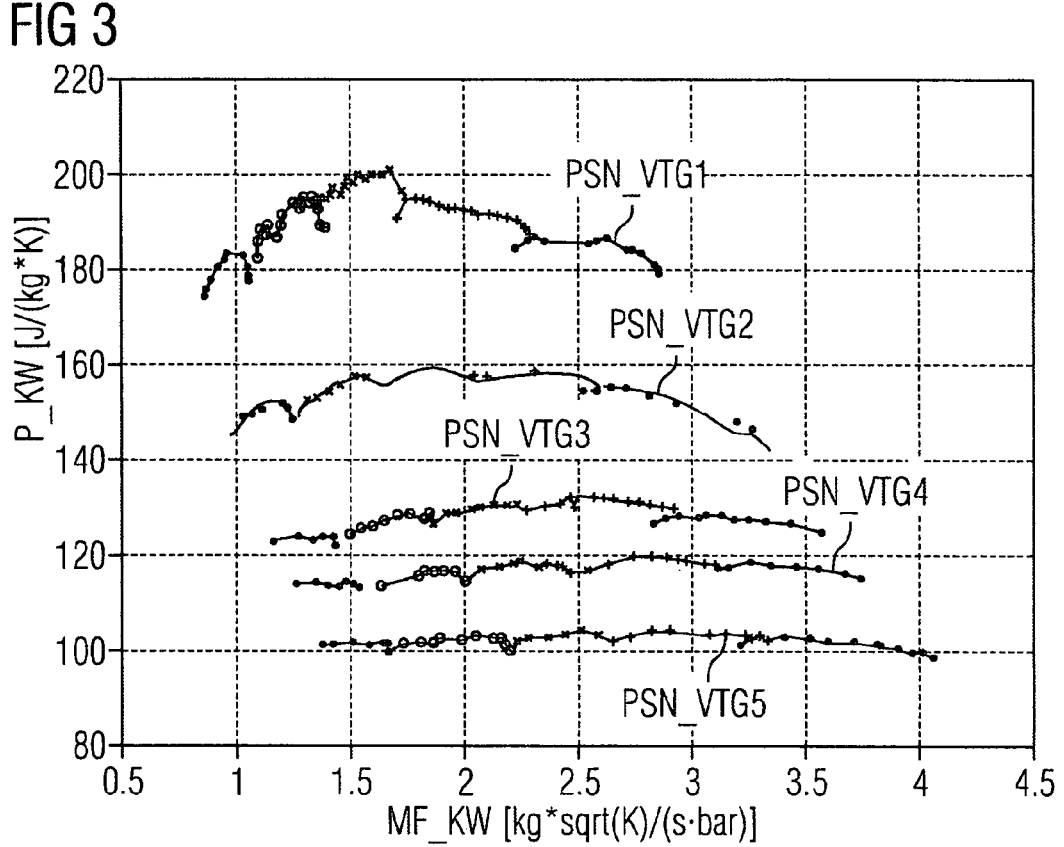

TRANS_KW 1, TRANS_KW2, TRANS_KW3 refer to first to third transformation characteristic values which are able to be suitably predetermined so that the same transformed performance characteristics P_KW_TRANS are assigned to essentially the same values of the adjuster position PSN_VTG. FIG. 3 shows a typical example of such an engine map KF_PSN_VTG for typical adjuster positions PSN_VTG1 through PSN_VTG5.

Figure 4:
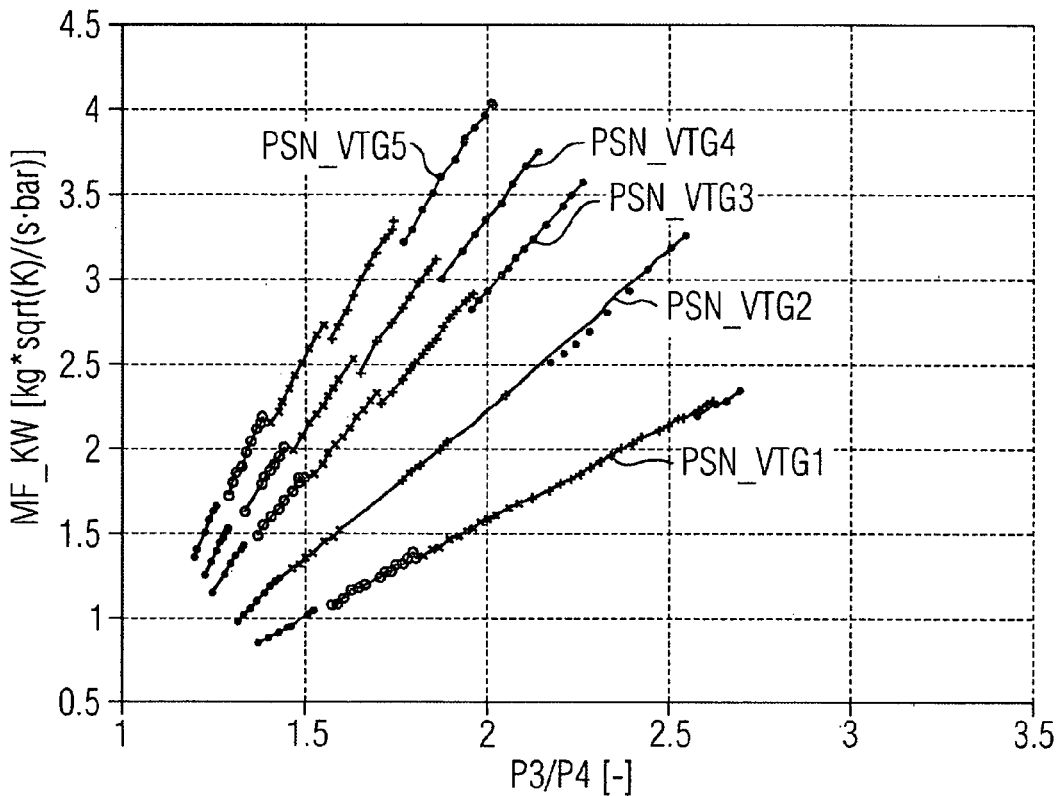

The engine map KF_PSN_VTG depicted in FIG. 3 is shown for measurement data records which have been assigned from corresponding engine maps of the relevant manufacturer of the exhaust gas turbocharger in a numerical manner. To store the engine map KF_PSN_VTG in a data memory of the control device 36 engine map support points for crossing points of the dashed lines of FIG. 3 are determined for example by interpolation between the relevant adjuster positions PSN_VTG1 to PSN_VTG5 and stored in the measurement data memory of the control device 36. The engine map KF_PSN_VTG now stored in this way in the data memory for the operation of the exhaust gas turbocharger then requires relatively little storage space. From the engine map also dimensioned in each case by the manufacturer of the exhaust gas turbocharger which represents the relationship between the mass flow characteristic through the turbine MF_KW_P3 which is related to the gas pressure P3 upstream of the turbine, the pressure quotient PQ, the turbine speed N_TUR and the relevant adjuster position PSN_VTG, the relevant mass flow characteristics MF_KW can be obtained by multiplying the relevant pressure quotient PQ by the mass flow characteristic MF_KW_P3 related to the gas pressure upstream of the turbine. This relationship is shown for the adjuster positions PSN_VTG1 to PSN_VTG5 in the example with reference to FIG. 4. Here too the influence of the turbine speed N_TUR can be ignored, and by interpolation between the known measuring points, a suitably dimensioned engine map KF_PQ can be determined and stored in the measurement data memory of the control device 36 with the input variables of the mass flow characteristic MF_KW and the respective adjuster position PSN_VTG. The output variable of this engine map which is referred to as engine map KF_PQ, is the pressure quotient PQ.

Figure 2:
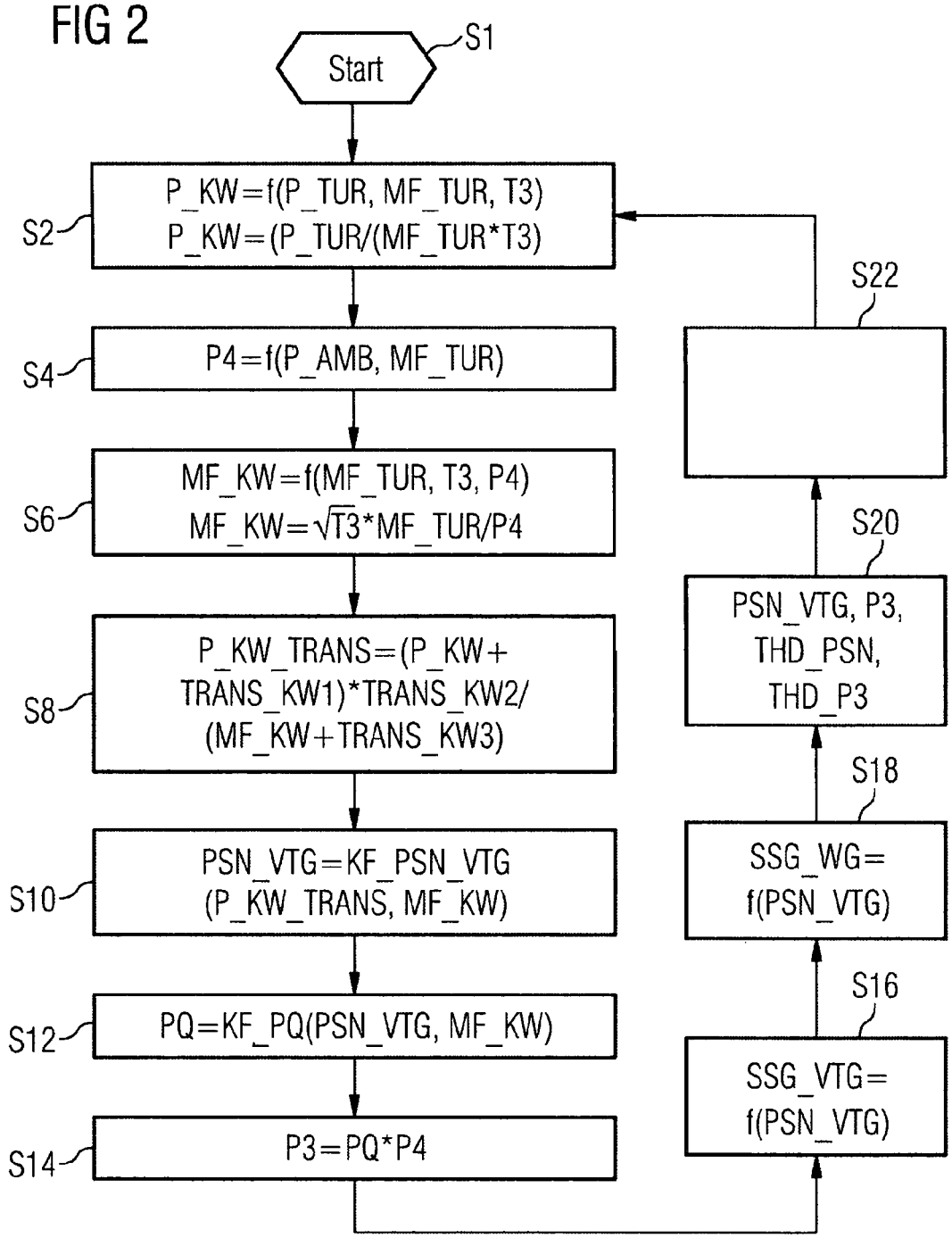

Using the engine maps KF_PSN_VTG and KF_PQ, the respective adjuster position PSN_VTG and the gas pressure P3 upstream of the turbine 18 can then be determined in the control device. This is done using the program explained in greater detail with reference to the flowchart shown in FIG. 2. The program is stored in a program memory of the control device 36 and is executed during the operation of the turbine 18 in the control device 36.

The program is started in a step S1, with this preferably being done close to the time that the internal combustion engine is started.

In a step S2 the performance characteristic P_KW is determined as a function of the turbine output P_TUR, the mass flow MF_TUR through the turbine 18 and the gas temperature T3 upstream of the turbine. This is preferably done in accordance with equation F5.

In a step S4 the downstream gas pressure P4 is determined depending on an ambient pressure P_AMB and a dynamic pressure. The ambient pressure P_AMB can be determined especially simply depending on the measuring signal of the dynamic pressure sensor 48, if the compressor 20 almost does not compress the induced air and a pressure drop across the throttle valve 5 is negligible. It can however also be detected by means of a suitable pressure sensor and by a suitably arranged pressure sensor. The dynamic pressure can be determined in a simple manner by means of a model which depends on the mass flow MF_TUR through the turbine 18 and is essentially predetermined by a geometry of the catalytic converter 28 and of the silencer.

In a step S6 the mass flow characteristic MF_KW is subsequently determined depending on the mass flow MF_TUR through the turbine 18, the gas temperature T3 upstream of the turbine 18 and the downstream gas pressure P4. This is preferably done using equation F7, of which the relevant part is also shown in step S6.

In a step S8 the transformed performance characteristic P_KW_TRANS is determined by means of the relationship predetermined by equation F8.

In a step S10 the adjuster position PSN_VTG is subsequently determined depending on the engine map KF_PSN_VTG with the input variables of the transformed performance characteristic P_KW_TRANS and of the mass flow characteristic MF_KW.

In a step S12 the pressure quotient PQ is subsequently determined from the engine map KF_PQ by corresponding engine map interpolation between support points of the engine map KF_PQ in accordance with the procedure shown in step S10 depending on the input variables of the engine map KF_PQ and indeed on adjuster position PSN VTG and the mass flow characteristic MF_KW.

In a step S14 the gas pressure P3 upstream of the turbine 18 is determined depending on the pressure quotient PQ multiplied by the downstream gas pressure P4. Subsequently in a step S16 an adjustment signal SSG_VTG is determined for the adjusting drive 22 to adjust the turbine geometry depending on the adjuster position PSN_VTG and subsequently the adjusting drive 22 is controlled accordingly for adjusting the turbine geometry.

If the bypass channel 24 and the exhaust valve 26 are present a corrective signal SSG_WG for controlling the exhaust valve 26 depending on the adjuster position PSN_VTG can also be determined. In this way the operating range of the exhaust gas turbocharger can be extended even further and adjuster positions PSN_VTG which cannot be controlled in respect of the effect of the turbine 18 can be adjusted by corresponding control of the bypass valve.

A step S20 can be provided as an alternative or in addition to step S16 and/or S18, in which a diagnosis of the exhaust gas turbocharger is undertaken depending on the adjuster position transferred in step S10 and at least one suitably selected threshold value THD_PSN of the adjuster position and/or depending on the upstream gas pressure P3 and at least one threshold value THD_P3 of the upstream gas pressure which is suitably predetermined. Subsequently the program pauses in a step S22 for a predetermined waiting time or also until the crankshaft has moved by a predeterminable angle, before processing is continued again in step S2 with newly initialized variables.

Alternatively the transformation in step S8 can also be dispensed with. In this case the performance characteristic P_KW is one of the input variables of the engine map KF_PSN_VTG for determining the adjuster position PSN_VTG instead of the transformed performance characteristic P_KW_TRANS.

The turbine output P_TUR, of the mass flow MF_TUR through the turbine 18 and the downstream gas pressure P4 are preferably setpoint values.

The adjuster position PSN_VTG is also preferably a setpoint value. The program in accordance with FIG. 2 effects a pilot control of the turbine 18. Preferably a closed-loop control can also be provided.

The invention claimed is:

1. A method for controlling an exhaust gas turbocharger, comprising:
    providing a compressor for the exhaust gas turbocharger;
    providing a turbine;
    providing an adjusting drive to adjust a turbine geometry;
    determining a performance characteristic based upon a turbine output, a mass flow through the turbine, a gas temperature upstream of the turbine and a downstream gas pressure downstream of the turbine, wherein the turbine output is based upon turbine efficiency;

determining a mass flow characteristic based upon the mass flow through the turbine, the gas temperature and the downstream gas pressure;

determining an adjuster position of the adjusting drive based upon the determined performance characteristic and the determined mass flow characteristic value via an engine map; and determining an adjusting signal to control the adjustment drive based upon the adjuster position.

2. The method as claimed in claim 1, wherein the performance characteristic is determined based upon the turbine output divided by the mass flow and divided by the gas temperature.

3. The method as claimed in claim 1, wherein the mass flow characteristic is determined based upon the turbine output multiplied by square root of the gas temperature and divided by the downstream gas pressure.

4. The method as claimed in claim 1, wherein the performance characteristic and the mass flow characteristic are the only input variables of the engine map.

5. The method as claimed in claim 1, wherein the performance characteristic is transformed, to assign engine map points of equally transformed performance characteristics to equivalent values of the adjuster position, and wherein the adjuster position for setting a turbine geometry is determined based upon the transformed performance characteristics.

6. The method as claimed in claim 1, wherein an upstream gas pressure upstream of the turbine is determined via a further engine map based upon the adjuster position and the mass flow characteristic.

7. The method as claimed in claim 1, wherein the downstream gas pressure is determined based upon an ambient pressure and a dynamic pressure that depends on the mass flow through the turbine.

8. The method as claimed in claim 7, wherein the dynamic pressure is determined based upon a model, wherein the model is based upon the mass flow through the turbine.

9. The method as claimed in claim 1, wherein an adjusting signal is determined for adjusting a setting of a by-pass valve in a by-pass based upon the adjuster position for a variable turbine geometry.

10. A method for diagnosing an exhaust gas turbocharger, comprising:

providing a compressor for the exhaust gas turbocharger;

providing a turbine;

providing an adjusting drive to adjust a turbine geometry;

determining a performance characteristic based upon a turbine output, a mass flow through the turbine, a gas temperature upstream of the turbine and a downstream gas pressure downstream of the turbine, wherein the turbine output is based upon turbine efficiency;

determining a mass flow characteristic based upon the mass flow through the turbine, the gas temperature and the downstream gas pressure;

determining an adjuster position of the adjusting drive based upon the determined performance characteristic and the determined mass flow characteristic value via an engine map; and diagnosing the exhaust gas turbocharger based upon the adjuster position.

11. The method as claimed in claim 10, wherein the performance characteristic is determined based upon the turbine output divided by the mass flow through the turbine and divided by the gas temperature upstream of the turbine.

12. The method as claimed in claim 10, wherein the mass flow characteristic is determined based upon the turbine output multiplied by square root of the gas temperature upstream of the turbine and divided by the downstream gas pressure.

13. The method as claimed in claim 10, wherein the engine map for determining the adjuster position has a first input variable based upon the performance characteristic and a second input variable based upon the mass flow characteristic.

14. The method as claimed in claim 10, wherein the performance characteristic is transformed, to assign engine map points of equally transformed performance characteristics to equivalent values of the adjuster position, and wherein the adjuster position for setting the turbine geometry is determined based upon the transformed performance characteristics.

15. A device for controlling an exhaust gas turbocharger, comprising:

a compressor;

a turbine;

an adjusting drive to adjust a turbine geometry;

a performance characteristic based upon a turbine output, a mass flow through the turbine, a gas temperature upstream of the turbine and a downstream gas pressure downstream of the turbine, wherein the turbine output is based upon turbine efficiency;

a mass flow characteristic based upon the mass flow through the turbine, the gas temperature upstream of the turbine and a downstream gas pressure downstream of the turbine;

an adjuster position of the adjusting drive for adjusting the turbine geometry based upon the determined characteristic and the determined mass flow characteristic value via an engine map; and an adjusting signal for controlling the adjustment drive for adjusting the turbine geometry based upon the adjuster position for adjusting the turbine geometry.

16. The device as claimed in claim 15, wherein the adjusting of the turbine geometry is based upon an adjustment of blades of the turbine.

17. The device as claimed in claim 15, wherein the exhaust gas turbocharger comprises a bypass channel routed in parallel to the turbine in an exhaust gas tract.

18. The device as claimed in claim 15, wherein the bypass channel comprises an exhaust valve.

19. The device as claimed in claim 15, wherein the engine map is stored in a data memory of the control device.

20. The device as claimed in claim 15, wherein the turbine is controlled based upon a pilot control.

* * * * *